(12) United States Patent
Yamamoto et al.

(10) Patent No.: US 9,563,574 B2
(45) Date of Patent: Feb. 7, 2017

(54) STORAGE CONTROL DEVICE AND METHOD OF CONTROLLING STORAGE CONTROL DEVICE

(71) Applicant: HITACHI, LTD., Tokyo (JP)

(72) Inventors: Naoko Yamamoto, Tokyo (JP); Ken Tokoro, Tokyo (JP); Yasuhiko Yamaguchi, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 47 days.

(21) Appl. No.: 14/760,303

(22) PCT Filed: Feb. 12, 2013

(86) PCT No.: PCT/JP2013/053212
§ 371 (c)(1),
(2) Date: Jul. 10, 2015

(87) PCT Pub. No.: WO2014/125559
PCT Pub. Date: Aug. 21, 2014

(65) Prior Publication Data
US 2015/0363331 A1 Dec. 17, 2015

(51) Int. Cl.
*G06F 12/12* (2016.01)
*G06F 12/08* (2016.01)
*G06F 13/30* (2006.01)

(52) U.S. Cl.
CPC ......... *G06F 12/122* (2013.01); *G06F 12/0871* (2013.01); *G06F 13/30* (2013.01); *G06F 12/126* (2013.01); *G06F 2212/50* (2013.01); *G06F 2212/604* (2013.01)

(58) Field of Classification Search
None
See application file for complete search history.

(56) References Cited

U.S. PATENT DOCUMENTS

| | | | |
|---|---|---|---|
| 2004/0162941 A1 | 8/2004 | Aigo | |
| 2005/0268031 A1 | 12/2005 | Matsui et al. | |
| 2009/0172679 A1 | 7/2009 | Yoshida et al. | |
| 2011/0202716 A1 | 8/2011 | Nakagawa | |

FOREIGN PATENT DOCUMENTS

| | | |
|---|---|---|
| JP | 2002-149492 A | 5/2002 |
| JP | 2004-252526 A | 9/2004 |
| JP | 2005-339299 A | 12/2005 |
| JP | 2011-170447 A | 9/2011 |
| JP | 2012-22532 A | 2/2012 |
| WO | 2012032577 A1 | 3/2012 |

*Primary Examiner* — Kevin Verbrugge
(74) *Attorney, Agent, or Firm* — Volpe and Koenig, P.C.

(57) ABSTRACT

To improve response performance of a storage control device. A storage control device 1 connected to a host computer 2 includes: a communication unit 1A that receives a command, to which a priority is set, from the host computer; a command executing unit 1B that executes the command received from the communication unit according to the priority; a cache memory 1C that is used by the command executing unit; a cache controller 1E that manages slots of the cache memory; and a plurality of storage devices 1D(1) and 1D(2) that stores data used by the host computer. The cache controller sets the priority to a slot that stores target data of the command and controls the data stored in the slot according to the priority.

7 Claims, 10 Drawing Sheets

(a)

Priority table T1

| Priority | Target response time | Actual response time | Target slot count | | Secured slot count | |
|---|---|---|---|---|---|---|
| | | | HDD | SSD | HDD | SSD |
| 1 | 1ms | 1.1ms | 59 | 2 | 58 | 2 |
| 2 | 5ms | 4.9ms | 30 | 1 | 30 | 1 |
| 3 | 10ms | 9.8ms | 6 | 0 | 6 | 0 |
| ... | ... | ... | ... | ... | ... | ... |

(b)

Slot priority management table T2

| Slot # | Priority | Type |
|---|---|---|
| 0 | 2 | HDD |
| 1 | 2 | HDD |
| 2 | 3 | SSD |
| 3 | 1 | HDD |
| ... | ... | ... |

Priority table T1

| Priority (C10) | Target response time (C11) | Actual response time (C12) | Target slot count (C13) | | Secured slot count (C14) | |
|---|---|---|---|---|---|---|
| | | | HDD | SSD | HDD | SSD |
| 1 | 1ms | 1.1ms | 59 | 2 | 58 | 2 |
| 2 | 5ms | 4.9ms | 30 | 1 | 30 | 1 |
| 3 | 10ms | 9.8ms | 6 | 0 | 6 | 0 |
| ... | ... | ... | ... | ... | ... | ... |

(b)

Slot priority management table T2

| Slot # (C20) | Priority (C21) | Type (C22) |
|---|---|---|
| 0 | 2 | HDD |
| 1 | 2 | HDD |
| 2 | 3 | SSD |
| 3 | 1 | HDD |
| ... | ... | ... |

STORAGE CONTROL DEVICE AND METHOD OF CONTROLLING STORAGE CONTROL DEVICE

TECHNICAL FIELD

The present invention relates to a storage control device and a method of controlling the storage control device.

BACKGROUND ART

As a method of controlling quality of service (QoS) of a storage control device, a method in which a host computer sets priorities to commands (Input/output requests (I/O requests)) and transmits the commands to a storage control device, and the storage control device controls the execution sequence (running sequence) of commands according to the priority set at the host computer is known (Patent Literature 1).

CITATION LIST

Patent Literature

[PTL 1]
WO 2012/032577

SUMMARY OF INVENTION

Technical Problem

According to the conventional technique, since the execution sequence of commands is controlled according to the priority set by the host computer, it is possible to improve QoS. However, controlling the execution sequence of commands only has a limit in improving the QoS.

For example, a case where a storage control device receives a read command having a high priority from a host computer will be discussed. When the target data of the read command is stored in a cache memory, the data can be immediately transmitted to the host computer. However, when the target data of the read command is not present on the cache memory, the data is read from a storage device and stored in the cache memory and is then transmitted to the host computer. In the latter case, even if a high priority is set to the read command, the time (response time) required for completely processing the read command increases, and the QoS deteriorates.

The present invention has been made in view of the above problem, and an object of the present invention is to provide a storage control device and a method of controlling the storage control device capable of improving response performance by controlling data on a cache memory according to priorities of commands.

Solution to Problem

In order to solve the above problem, according to the present invention, there is provided a storage control device connected to a host computer, including: a communication unit that receives a command, to which a priority is set, from the host computer; a command executing unit that executes the command received from the communication unit according to the priority; a cache memory that is used by the command executing unit; a cache controller that manages slots of the cache memory; and a plurality of storage devices that store data used by the host computer, wherein the cache controller sets the priority to a slot that stores target data of the command and controls the data stored in the slot according to the priority.

Additional features of the present invention will be understood from the explanation of this description and the attached drawings. The aspects of the present invention are accomplished and realized by constituent elements, various combinations of the constituent elements, and the following detailed description.

It is to be understood that the explanation in this description illustrates typical examples and does not restrict the claims or application examples of the present invention in any sense.

BRIEF DESCRIPTION OF DRAWINGS

FIGS. 5(a) and 5(b) are explanatory diagrams showing a priority table and a slot priority management table, respectively.

DESCRIPTION OF EMBODIMENTS

Figure 1:
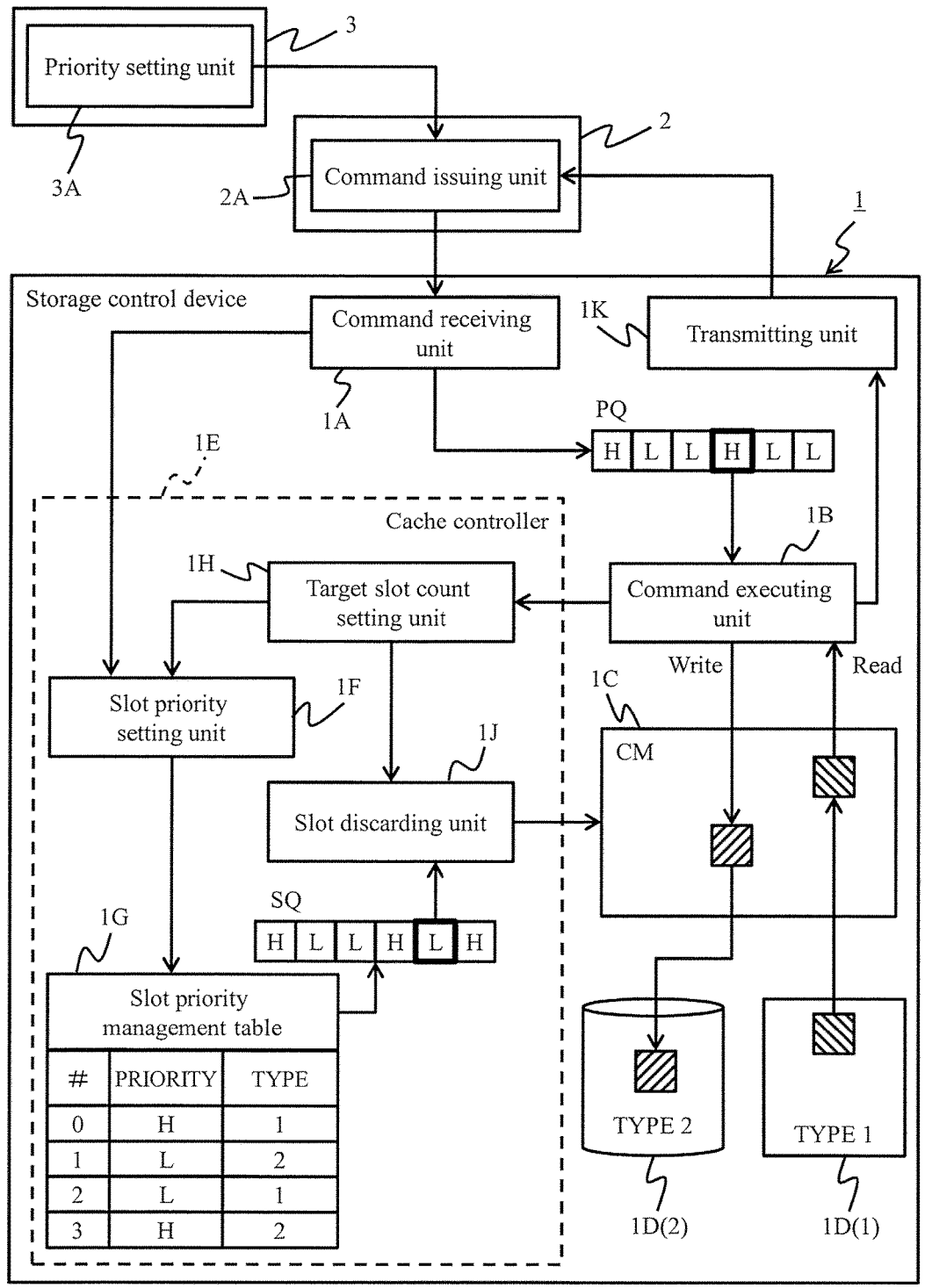
FIG. 1 is a schematic diagram showing an example of an embodiment.

Hereinafter, embodiments of the present invention will be described with reference to the attached drawings. In the attached drawings, functionally the same elements may be displayed by the same reference numerals. The attached drawings illustrate specific embodiments and examples according to the principle of the present invention. The embodiments and examples in the attached drawings are for the understanding of the present invention and are not to be used to restrictively interpret the present invention.

Although the present embodiments describe the present invention in detail enough for those skilled in the art to carry out the present invention, other examples and modes are also possible. It should be understood that changes in configurations and structures as well as replacements of various elements are possible without departing from the scope and the spirit of the technical concept of the present invention. Therefore, the following description should not be interpreted restrictively.

Furthermore, as described below, the embodiments of the present invention may be implemented by software operated on a general-purpose computer, or may be implemented by dedicated hardware or a combination of software and hardware.

Although management information of the present invention will be described in "table" formats in the following description, the management information does not have to be expressed by data structures based on tables, and the information may be expressed by data structures, such as a list, a DB, and a queue, or by other ways. Therefore, the "table", the "list", the "DB", the "queue", and the like may be simply called "information" to indicate independence from the data structure.

In the following description, the processes of the embodiments of the present invention are sometimes described with a "program" serving as a subject (operational subject). However, since the program is executed by a processor to execute a predetermined process while using a memory and a communication port (communication control device), the processor may serve as a subject in the description. A part or an entire part of the program may be realized as dedicated hardware or may be realized as a module. Various programs may be installed on computers through a program distribution server or storage media.

FIG. 1 is an explanatory diagram showing an outline of the present embodiment. An information processing system shown in FIG. 1 includes one or more storage control devices 1, one or more host computers 2, and one or more management computers 3.

The storage control device 1 is configured to control input and output of data to/from a plurality of storage devices 1D(1) and 1D(2) and is communicably connected to the host computer 2. The details of the storage control device 1 will be described later.

The host computer 2 has application programs mounted thereon and issues commands necessary for processing the application programs to the storage control device 1. A command issuing unit 2A which is one of the functions of the host computer 2 issues commands to which priorities are set.

The management computer 3 includes a priority setting unit 3A that sets priorities to the commands that are issued from the command issuing unit 2A of the host computer 2. The priorities can be set according to the type of application programs, the type of commands, and the like, for example.

The storage control device 1 includes a command receiving unit 1A, a command executing unit 1B, a cache memory 1C, a storage device 1D, a cache controller 1E, and a command transmitting unit 1K, for example.

The command receiving unit 1A is communicably connected to the host computer 2 and receives the commands to which priorities are set, issued from the command issuing unit 2A. The command receiving unit 1A transmits the received commands to one of a plurality of command executing units 1B so that the commands are processed by the command executing unit 1B. The commands are managed by a priority queue PQ.

The command executing unit 1B selects a command having the higher priority among the commands stored in the priority queue PQ and executes the selected command. In FIG. 1, for the sake of convenience, the priorities are classified into two levels of a high priority "H" and a low priority "L". As in examples described later, the priorities may be classified into three levels or more.

Upon receiving a write command, the command executing unit 1B secures a vacant slot on the cache memory 1C and stores write data in the secured vacant slot. The write data stored in the slot of the cache memory 1C is written to the storage device 1D at an appropriate point of time. The slot of which the data is written to the storage device 1D is released as necessary to become a vacant slot and is used for storing other data. In this description, releasing and reusing a slot is sometimes referred to as "discarding data of the slot".

Upon receiving the read command, the command executing unit 1B determines whether the data (read data) requested by the read command is stored in the cache memory 1C. When the read data is present on the cache memory 1C, the command executing unit 1B transmits the data read from the cache memory 1C from the transmitting unit 1K to the host computer 2. When the read data is not present on the cache memory 1C, the read data is read from the storage device 1D that stores the read data and is stored in the cache memory 1C. The command executing unit 1B transmits the read data, which has been transmitted from the storage device 1D to the cache memory 1C, from the transmitting unit 1K to the host computer 2.

The cache memory 1C is a storage area in which the data received from the host computer 2 and the data read from the storage device 1D are temporarily stored. The cache memory 1C may be configured as a dedicated cache memory, or a partial storage area of a shared memory may be used as a cache memory area.

The storage device 1D is a device for storing data. The storage device 1D can be roughly classified into a high-speed storage device 1D(1) having a high response speed and a low-speed storage device 1D(2) having a low response speed. Further, a storage device having an intermediate response speed may be installed. A flash memory device is an example of the high-speed storage device 1D(1). A hard disk drive is an example of the low-speed storage device 1D(2). Storage devices of the same storage media may have a large difference in response speed. Thus, storage devices which operate by the same principle may be classified by their response speed such as into a high-speed hard disk drive, a low-speed hard disk drive, a high-speed flash memory device, and a low-speed flash memory device.

The cache controller 1E controls the slots of the cache memory 1C. The cache controller 1E includes a slot priority setting unit 1F, a slot priority management table 1G, a target slot count setting unit 1H, a slot discarding unit 1J, and a slot queue SQ.

The slot priority setting unit 1F is a function of setting a priority of a command to a slot of the cache memory 1C, the command being associated with the slot. The command associated with the slot is a command of which the target data is stored in the slot.

The slot priority management table 1G is a table for managing the priorities of the slots. The slot priority management table 1G manages a slot number (#), a priority, and the class of the storage device 1D in association.

The slot queue SQ is configured to manage data on the cache memory 1C as queues in units of slots, and queues are connected to the slot queue SQ so that the newer data queue is connected first.

The target slot count setting unit 1H is a function of setting a target slot count for each priority based on a target response time that is set for each priority. The target slot count setting unit 1H may adjust the target slot count based on a difference between the target response time set for each priority and the actual response time obtained when commands were actually processed according to the priority. For example, for a certain priority, when the actual response time is longer than the target response time, the target slot count setting unit 1H increases the target slot count set for the priority to allocate a larger number of slots than the present slot count. In this manner, the probability of cache hits increases, the actual response time decreases, and the difference between the actual response time and the target response time decreases. In contrast, when the actual response time is shorter than the target response time, the target slot count setting unit 1H decreases the target slot count to allocate a smaller number of slots than the present slot count. In this manner, the probability of cache hits decreases, the actual response time increases, and the difference between the actual response time and the target response time decreases.

Further, the target slot count setting unit 1H may allocate the target slot count of each priority for each class of the storage devices 1D according to the ratio of the reciprocals of the response speeds of the storage devices 1D, for example.

For example, it is assumed that the response speed of the high-speed storage device 1D(1) is three times the response speed of the low-speed storage device 1D(2), and 100 slots are allocated to the high priority H. In this case, 75 slots can be allocated to the data of which the storage destination is the low-speed storage device 1D(2), and 25 slots can be allocated to the data of which the storage destination is the high-speed storage device 1D(1). By allocating a large number of slots to the low-speed storage device 1D(2), it is possible to increase the probability of cache hits to shorten the response time.

The slot discarding unit 1J is a function of releasing used slots to discard data when vacant slots on the cache memory 1C become insufficient. The slot discarding unit 1J selects a slot having the lowest priority among the oldest slots and releases the selected slot to discard the data. The released slot becomes a vacant slot and is used for storing new data.

The transmitting unit 1K transmits processing results on commands to the host computer 2. The command receiving unit 1A and the transmitting unit 1K may be provided within one communication device as will be described later.

In the present embodiment having such a configuration, the host computer 2 issues commands to which priorities are set, and the command executing unit 1B processes a command having a high priority preferentially. Further, the cache controller 1E sets priorities to slots, in which the target data of the command is stored, according to the priority of the command and performs control so that the data of a high priority slot is present on the cache memory 1C for a longer period.

Thus, for example, when a read command having a high priority is issued, the probability that the read data which is the target of the read command can be found on the cache memory 1C increases, and the response time can be reduced. In this manner, in the present embodiment, the configuration of controlling the execution sequence of commands according to the priority and the configuration of controlling data on the cache memory 1C according to the priority are combined. Thus, it is possible to process commands having a high priority in a shorter response time and to improve the response performance of the storage control device 1.

Moreover, in the present embodiment, since the target slot count set for each priority is controlled according to the difference between the target response time for each priority and the actual response time, a number of slots appropriate for the condition of the storage control device 1 can be allocated to each priority. As a result, an appropriate target slot count can be set according to a load state of the storage control device 1, the type of commands issued from the host computer 2, and the like, and the response performance of the storage control device 1 can be improved.

In the present embodiment, the target slot count for each priority is allocated according to the class of the storage device 1D (a high-speed storage device and a low-speed storage device). Thus, for example, by allocating a larger number of slots to the low-speed storage device 1D(2) than the number of slots allocated to the high-speed storage device 1D(1), it is possible to improve the overall response performance. Since the time required for reading data from the high-speed storage device 1D(1) is shorter than the time required for reading data from the low-speed storage device 1D(2), it is possible to reduce the overall response time when a cache miss occurs. Hereinafter, examples of the present embodiment will be described.

Example 1

Figure 2:
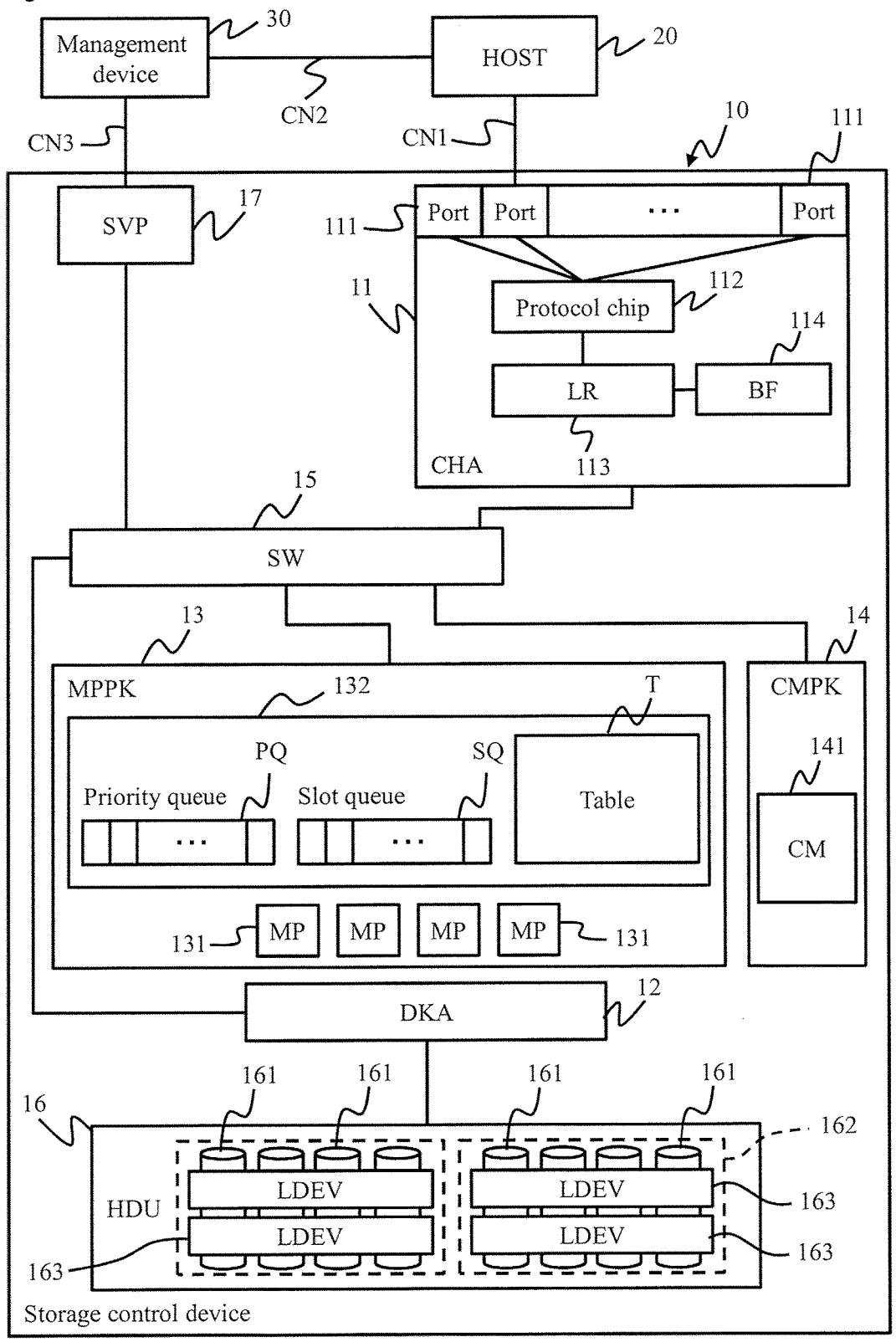
FIG. 2 is an explanatory diagram showing a hardware configuration of a storage control device.

FIG. 2 is an explanatory diagram showing a hardware configuration of an information processing system that includes a storage control device 10. First, the correspondence between the embodiment described in FIG. 1 and this example will be described.

The storage control device 10 corresponds to the storage control device 1, a host computer 20 corresponds to the host computer 2, and a management device 30 corresponds to the management computer 3. A channel adapter (CHA) 11 which is an example of a "host-side communication device" corresponds to the command receiving unit 1A and the transmitting unit 1K. In the figure, although only one CHA 11 is illustrated, a plurality of CHAs 11 may be provided in the storage control device 10.

A communication configuration that connects the respective devices 10, 20, and 30 will be described. The host computer 20 and the storage control device 10 are connected via a first communication path CN1. The host computer 20 and the management device 30 are connected via a second communication path CN2. The management device 30 and the storage control device 10 are connected via a third communication path CN3. The communication paths CN1, CN2, and CN3 may be formed on different communication networks and may be formed on the same communication network. As an example, the respective communication paths CN1, CN2, and CN3 may be formed as an IP network such as the Internet or a LAN. Alternatively, the first communication path CN1 may be formed using an IP network or a fibre channel-storage area network (FC-SAN), and the second and third communication paths CN2 and CN3 may be formed using an IP network.

A disc adapter (DKA) 12 which is an example of a "drive-side communication device" controls input and output of data to and from a plurality of storage devices 163. In the figure, although one DKA 12 is illustrated, a plurality of DKAs 12 may be provided in the storage control device 10.

A microprocessor package (MPPK) 13 which is an example of a "microprocessor device" processes the commands received from the CHA 11 and realizes the command executing unit 1B, the cache controller 1E, the slot priority management table 1G, the slot queue SQ, and the priority queue PQ.

The MPPK 13 includes a plurality of microprocessors 131 and a shared memory 132, for example. The shared memory 132 is used by the respective microprocessors 131 and stores tables T1 and T2 described later, the priority queue PQ, and the slot queue SQ.

The cache memory package (CMPK) 14 corresponds to the cache memory 1C in FIG. 1 and includes a cache memory 141.

A switch 15 connects the packages 11, 12, 13, and 14 and a service processor (SVP) 17 described later so as to communicate with each other.

A storage unit (HDU) 16 includes a plurality of storage devices 161, and the respective storage devices 161 are connected to the DKA 12. As the storage device 161, various devices capable of reading and writing data such as a hard disk drive, a semiconductor memory drive, an optical disc drive, or an opto-magnetic disc drive can be used, for example.

In the case of the hard disk drive, a fibre channel (FC) disk, a small computer system interface (SCSI) disk, a SATA disk, an AT attachment (ATA) disk, a serial attached SCSI (SAS) disk, and the like can be used, for example. Moreover, various storage devices such as a flash memory, a ferroelectric random access memory (FeRAM), a magnetoresistive random access memory (MRAM), an ovonic unified memory, or an RRAM™ may be used, for example.

A group 162 may be formed from physical storage areas of one or plural storage devices 161, and the storage area of the grouped physical storage area 162 may be divided in a predetermined size or an optional size, whereby a logical volume 163 which is a logical storage area can be obtained.

The storage unit 16 is not necessarily provided in the housing of the storage control device 10. The storage unit 16 may be provided outside the housing of the storage control device 10 so as to be communicably connected to the DKA 16 in the storage control device 10. Further, another storage control device not shown in the figure may be communicably connected to the storage control device 10 so that a storage device under the control of the other storage control device is used by the storage control device 10.

The SVP 17 is a device for communicating with the management device 30. The management device 30 can acquire information of various states of the storage control device 10 via the SVP 17. The management device 30 can input various setting to the storage control device 10 via the SVP 17.

Figure 3:
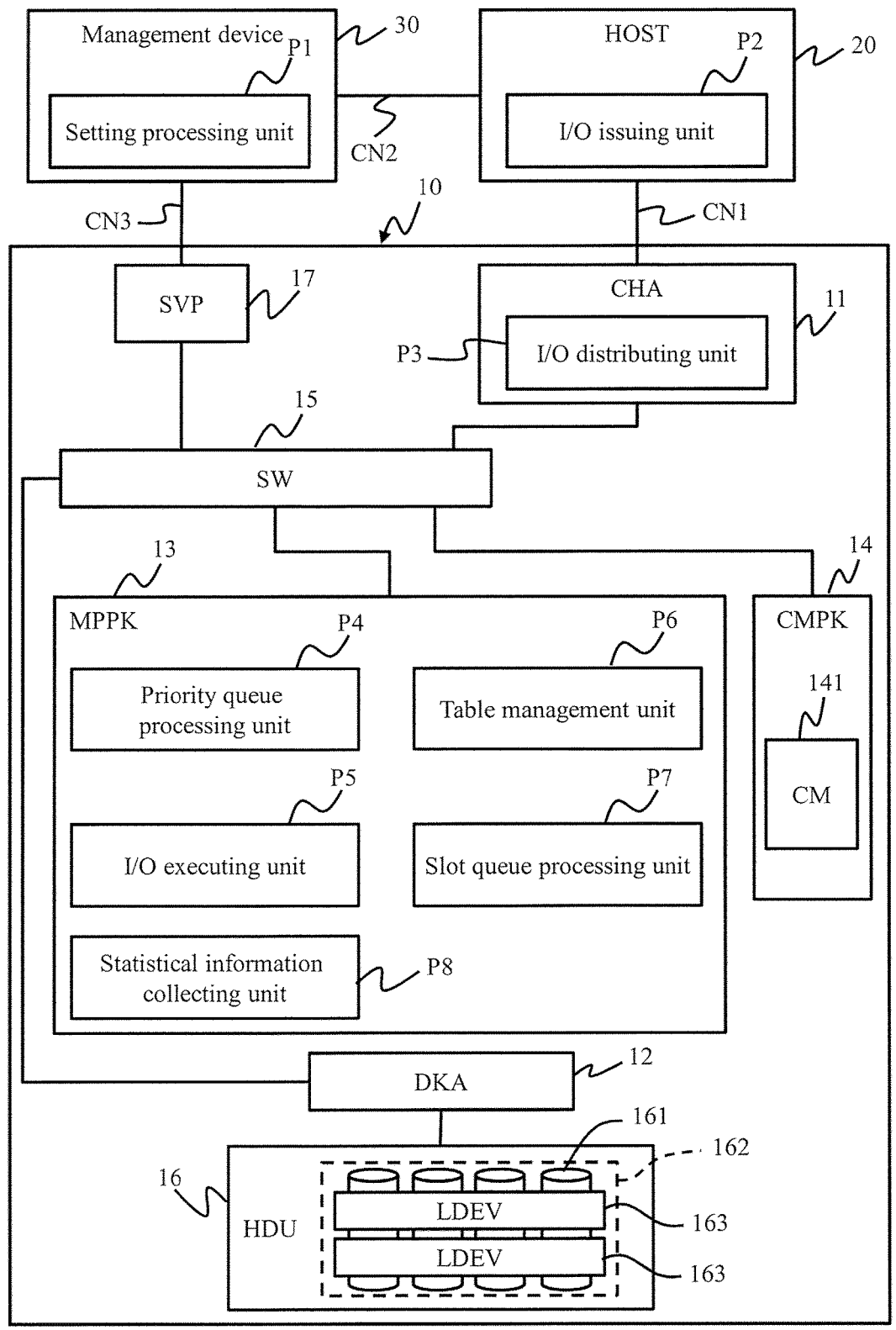
FIG. 3 is an explanatory diagram showing a functional configuration of the storage control device.

The functional configuration will be described with reference to FIG. 3. Although the respective functions described below are generally realized when a microprocessor executes a computer program, the present invention is not limited to this, and at least a portion of the processes may be executed by a dedicated hardware circuit.

The management device 30 includes a setting processing unit P1. The setting processing unit P1 is a function of setting a priority of each command or the like to the host computer 20 and setting a target response time or the like to the storage control device 10.

The host computer 20 includes an I/O issuing unit P2. The I/O issuing unit P2 corresponds to the command issuing unit 2A in FIG. 1. The I/O issuing unit P2 designates a logical address of target data and issues a read command or a write command, for example. The I/O issuing unit P2 assigns a priority prepared for each command and issues commands.

The functional configuration of the storage control device 10 will be described. The CHA 11 includes an I/O distributing unit P3. The I/O distributing unit P3 distributes the commands received from the host computer 20 to any one of the plurality of MPs 131 in the MPPK 13 so that the commands are processed by the MP 131. For example, the I/O distributing unit P3 can distribute commands to any MPs 131 according to a round robin method or the like. The I/O distributing unit P3 corresponds to the command receiving unit 1A in FIG. 1.

The MPPK 13 includes a priority queue processing unit P4, an I/O executing unit P5, a table management unit P6, a slot queue processing unit P7, and a statistical information collecting unit P8, for example.

The priority queue processing unit P4 controls the priority queue PQ. The I/O executing unit P5 executes the commands (I/O requests) transmitted from the CHA 11 and corresponds to the command executing unit 1B in FIG. 1.

The table management unit P6 appropriately updates and manages the priority management table T1 and the slot priority management table T2. The slot queue processing unit P7 controls the slot queue SQ. The statistical information collecting unit P8 collects statistical information such as an actual response time, for example. The statistical information collecting unit P8 controls the target slot count using the statistical information as will be described later.

A method of managing the slot queue SQ will be described with reference to FIG. 4. For example, when data is transmitted from the storage device 161 to the cache memory 141, a vacant slot for storing the data is required. In the case of a control method known as least recently used (LRU), data is sequentially discarded from the least recently used data. A slot that stores data for a predetermined period after the last time the data was used is reused as a vacant slot.

Figure 4:
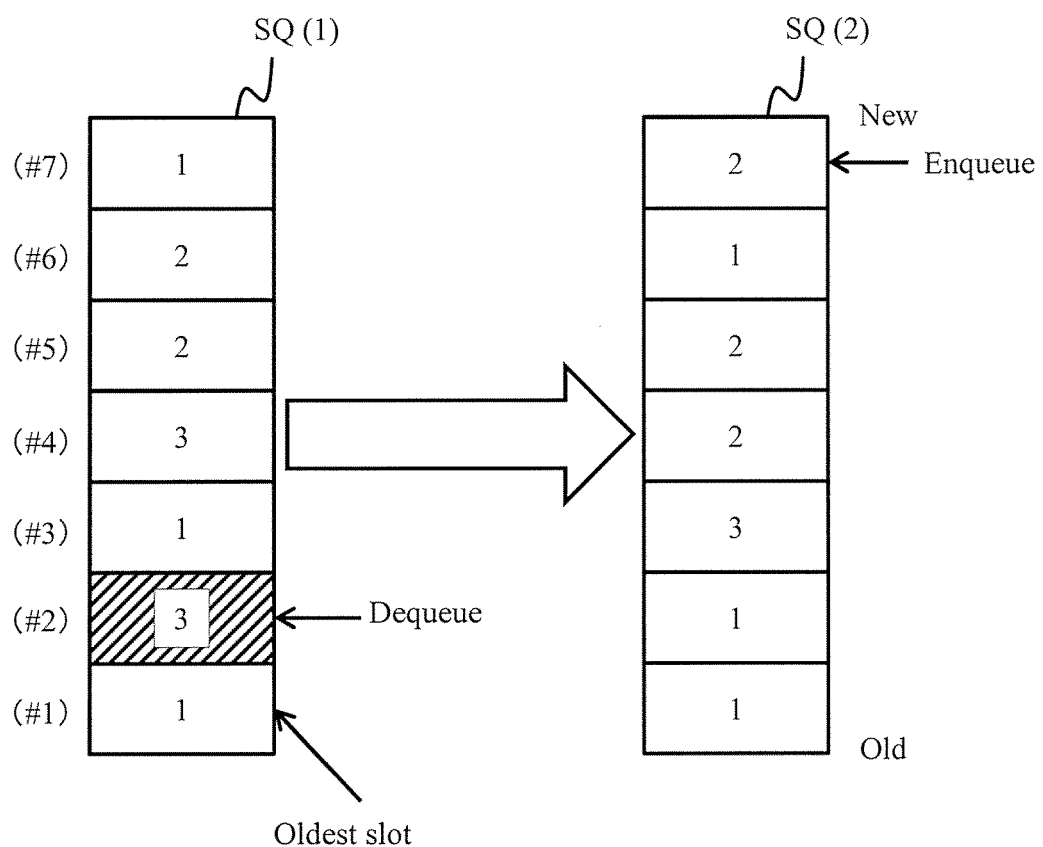
FIG. 4 is an explanatory diagram showing a method of discarding data using a slot queue.

A slot queue SQ(1) before data is discarded is shown to the left of FIG. 4, and a slot queue SQ(2) after data is discarded is shown to the right of FIG. 4. The slots located closer to the bottom of each slot queue SQ is older than the slots located closer to the top of each slot queue SQ. Moreover, the slots associated with the slot queue SQ have respective priorities, and in this example, the priorities are expressed as numbers 1 to 3. The smaller the priority number, the higher is the priority. That is, the priority decreases in the order of priorities 1, 2, and 3 (priority 1>priority 2>priority 3). In order to specify slots, numbers in parenthesis are added next to the slots.

In a general case, although the data (#1) of the oldest slot is discarded first, in this example, as shown in the slot queue SQ(1), the oldest slot (#2) (indicated by diagonal lines) among the slots having the lowest priority is selected as target data to be discarded. As a result, one vacant slot is created, and a new slot (#7) having the priority 2 is added to the slot queue SQ(2) as shown to the right of FIG. 4.

If two vacant slots are required, the slots (#2 and #4) having the lowest priority 3 are discarded among the slots included in the slot queue SQ(1) on the right side of FIG. 4.

A table configuration will be described with reference to FIG. 5. FIG. 5(a) shows a table T1 for managing priorities, and FIG. 5(b) shows a table T2 for managing slot priorities.

The priority table T1 manages a priority C10, a target response time C11, an actual response time C12, a target slot count C13, and a secured slot count C14 in association, for example.

The priority C10 is a priority associated with processing of commands (I/O requests), and in this example, the smaller the number, the higher is the priority. The target response time C11 is a value set for each priority and is a target value of the time required for processing a command having the priority. The actual response time C12 is a value measured for each priority and is an actual value required for processing the command.

The target slot count C13 is the number of slots allocated for each priority. The target slot count C13 is allocated according to the class of the storage device 161. For example, when N slots in total are allocated to a certain priority as a target slot count, n1 slots are allocated to a storage device of one class, and n2 slots are allocated to a storage device of the other class. The sum of the numbers of slots allocated to the storage devices is equal to N (N=n1+n2). Since the response performance (response speed) is different depending on the class of the storage device 161, and the influence on the response performance of the storage control device 10 is different, the target slot count is allocated according to the class of the storage device. By allocating a larger number of slots to the storage device having low response performance, it is possible to improve the response performance associated with the priority.

The secured slot count C14 indicates the number of slots secured for each priority. That is, the secured slot count C14 is the number of slots being used for each priority. The secured slot count is also managed according to the class of the storage device.

The slot priority management table T2 includes a slot number C20, a priority C21, and a storage device class C22, for example. The slot number C20 is a number for identifying a slot which is the unit of storage of the cache memory 141. The priority C21 is a priority set to the slot. In this example, the priority set to the command is also set to the slot that stores the target data of the command.

As described below, when the MPPK 13 receives a new command of which the target data is stored in the slot, and the priority of the new command is higher than the priority of the slot, the priority of the slot is updated to a high priority.

In this example, the priority of a command and the priority of a slot have the same classification such as "A, B, C" or "1, 2, 3", for example. In contrast, the priority of a command may have a different classification from the classification of the priority of a slot. For example, the priority of a command may be classified in five levels of "1, 2, 3, 4, 5", and the priority of a slot may be classified in three levels of "A, B, C".

The storage device class (type in the figure) C22 indicates the class of the storage device which is a storage destination of the data stored in a slot. "HDD" represents a hard disk drive, and "SSD" represents a flash memory device. The present invention is not limited to this, and for example, the present invention can be applied to other types of storage devices having different response performance such as "SATA", "FC", "SSD", and "PRAM".

Figure 6:
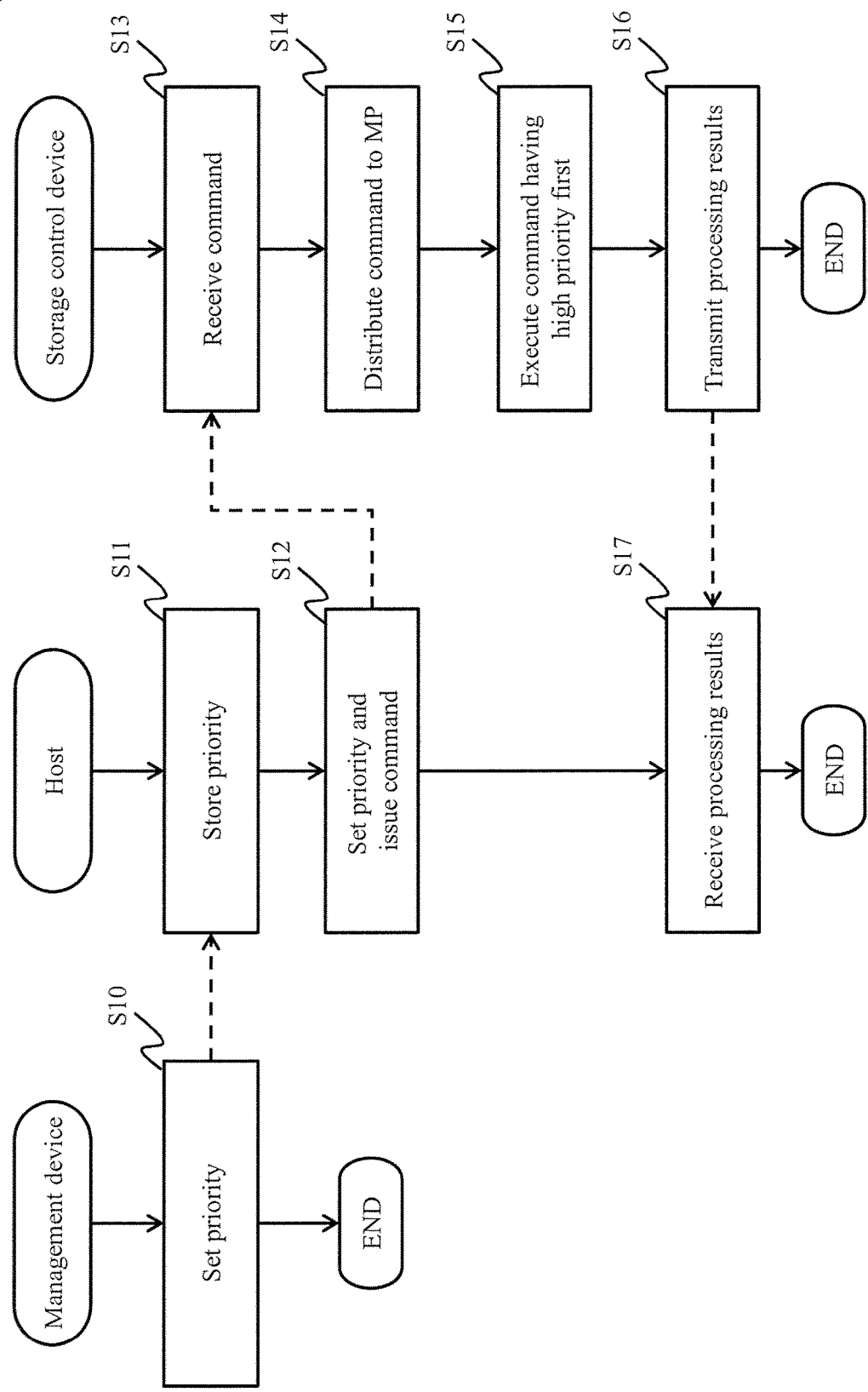
FIG. 6 is a flowchart showing a process of executing commands according to a priority.

An overview of a method of processing commands according to a priority will be described with reference to FIG. 6. First, the management device 30 sets a priority of each command to the host computer 20 (S10). The host computer 20 stores the set priorities (S11).

When issuing a command to the storage control device 10, the host computer 20 sets a priority corresponding to the command (S12). The CHA 11 of the storage control device 10 receives a command, to which a priority is set, from the host computer 20 (S13). The CHA 11 distributes the command received in step S13 to any one of the plurality of MPs 131 in the MPPK 13 (S14). The command is associated with the priority queue PQ.

The MP 131 that is assigned to process commands executes a command having the highest priority preferentially by referring to the priority queue PQ (S15). The storage control device 10 transmits the command processing results at the MP 131 from the CHA 11 to the host computer 20 (S16). The host computer 20 receives the command processing results (S17).

Figure 7:
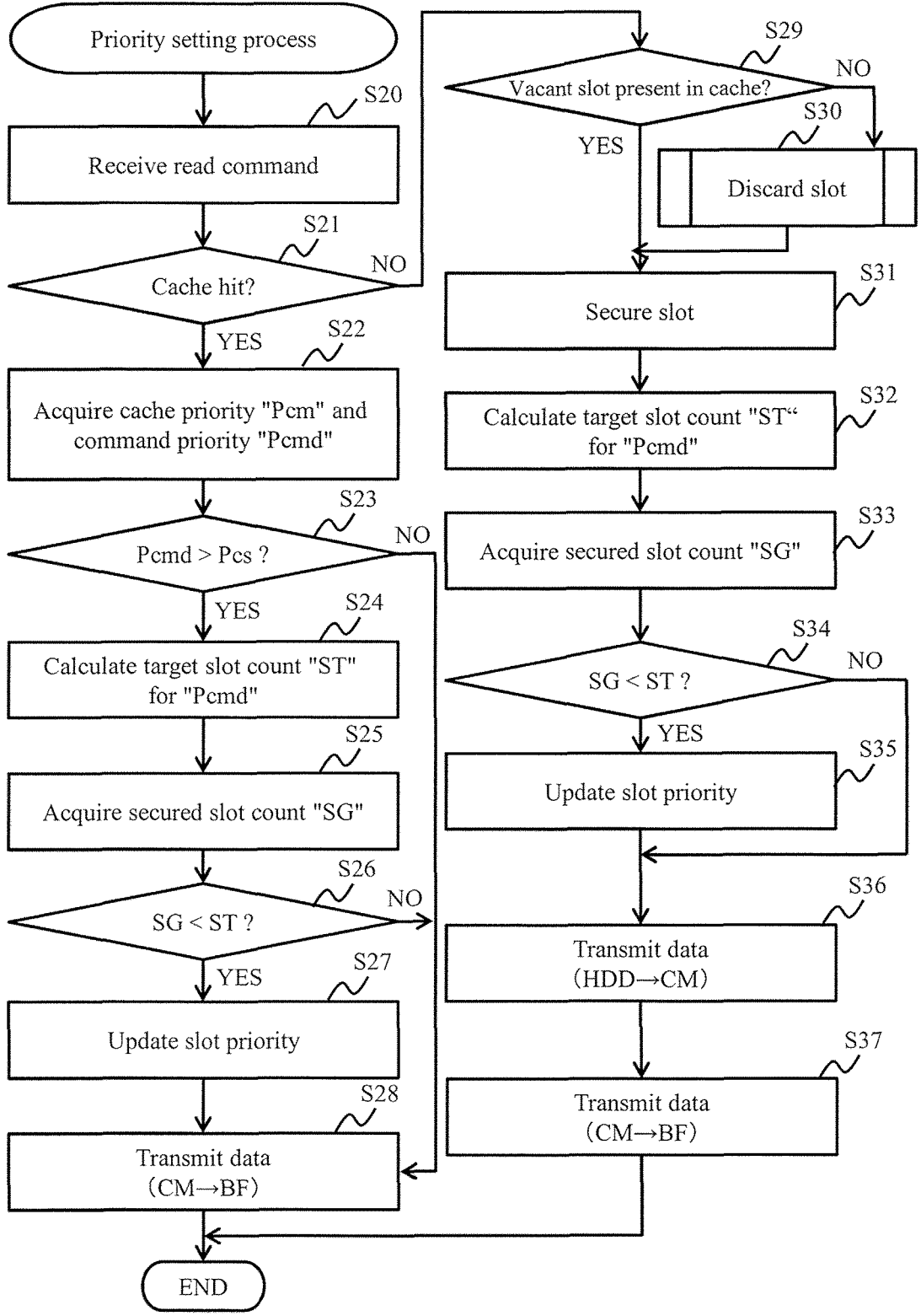
FIG. 7 is a flowchart showing a process of setting priorities to slots according to the priority of a command.

A process of setting a priority to a slot upon receiving a command will be described with reference to FIG. 7. In this process, a case where a read command is received will be described as an example. In the process shown in FIGS. 7 to 9, although the MP 131 serves as an operational subject, the storage control device 10, the cache controller, the MPPK 13, the name of a predetermined function, or the like may be the operational subject.

The CHA 11 of the storage control device 10 transmits the read command received from the host computer 20 to the MPPK 13 (S20). The read command to which a priority is set is stored in the priority queue PQ.

The MP 131 to which the read command transmitted from the CHA 11 is allocated among the plurality of MPs 131 of the MPPK 13 determines whether the data (read data) requested by the read command is present on the cache memory 141 (S21).

When the requested read data is stored in the cache memory 141 (S21: YES), the MP 131 determines whether a priority Pcmd set to the read command is higher than a priority Pcs of the data stored in the slot of the cache memory 141 (S23). Hereinafter, for the sake of convenience, the priorities Pcmd and Pcs are sometimes expressed as a command priority Pcmd and a slot priority Pcs.

When it is determined that the command priority Pcmd is higher than the slot priority Pcs (S23: YES), the MP 131 calculates a target slot count ST for the command priority Pcmd (S24). A method of calculating the target slot count will be described later with reference to FIG. 9.

The MP 131 acquires a secured slot count SG corresponding to the command priority Pcmd from the priority management table T1 (S25) and determines whether the secured slot count SG is smaller than the target slot count ST (S26).

When the MP 131 determines that the secured slot count SG for the command priority Pcmd is smaller than the target slot count ST (S26: YES), the MP 131 updates the slot priority management table T2 (S27). That is, the MP 131 updates the priority C21 in the slot priority management table T2, of the slot that stores the read data with the command priority Pcmd and updates the class C22 of the storage device which is a storage destination of the slot (S27).

After that, the MP 131 transmits the read data on the cache memory 141 to a buffer memory 114 of the CHA 11 so that data is transmitted from the CHA 11 to the host computer 20 and ends this process (S28).

When it is determined in step S23 that the slot priority Pcs is higher than the command priority Pcmd (S23: NO), the MP 131 proceeds to step S28 to transmit the read data on the cache memory 141 to the buffer memory 114 of the CHA 11 and then ends this process. In this example, the higher priority among the set slot priority Pcs and the priority Pcmd of the newly issued command is set to the slot.

When it is determined in step S26 that the secured slot count SG is equal to or larger than the target slot count ST (S26: NO), the MP 131 proceeds to step S28 to transmit the read data on the cache memory 141 to the buffer memory 114 and ends this process.

When it is determined in step S21 that the read data requested by the read command is not present on the cache memory 141 (S21: NO), the MP 131 determines whether a vacant slot is present in the cache memory 141 (S29).

When it is determined that a vacant slot is not present (S29: NO), a process of discarding a slot that satisfies a predetermined discarding condition is executed in order to create a place for storing the read data transmitted from the storage device 161 (S30). The slot discarding process will be described with reference to FIG. 8.

When it is determined that a vacant slot is present in the cache memory 141 (S29: YES), or when an existing slot is discarded so that a vacant slot is created (S30), the MP 131 secures the vacant slot (S31).

The MP 131 calculates a target slot count ST for the priority Pcmd of the read command (S32) and acquires a slot count SG secured for the priority Pcmd from the priority management table T1 (S33). The MP 131 determines whether the secured slot count SG is smaller than the target slot count ST (S34).

When it is determined that the secured slot count SG is smaller than the target slot count ST (S34: YES), the MP 131 updates the priority C21 and the like of the slot priority management table T2 (S35). When it is determined that the secured slot count SG is equal to or larger than the target slot count ST (S34: NO), the flow proceeds to step S36 by skipping step S35.

The MP 131 causes the DKA 12 to transmit the read data from the storage device 161 to the cache memory 141 (S36) and to transmit the read data from the cache memory 141 to the buffer memory 114 of the CHA 11 (S37), and then ends this process. After that, the CHA 11 transmits the read data to the host computer 20.

Figure 8:
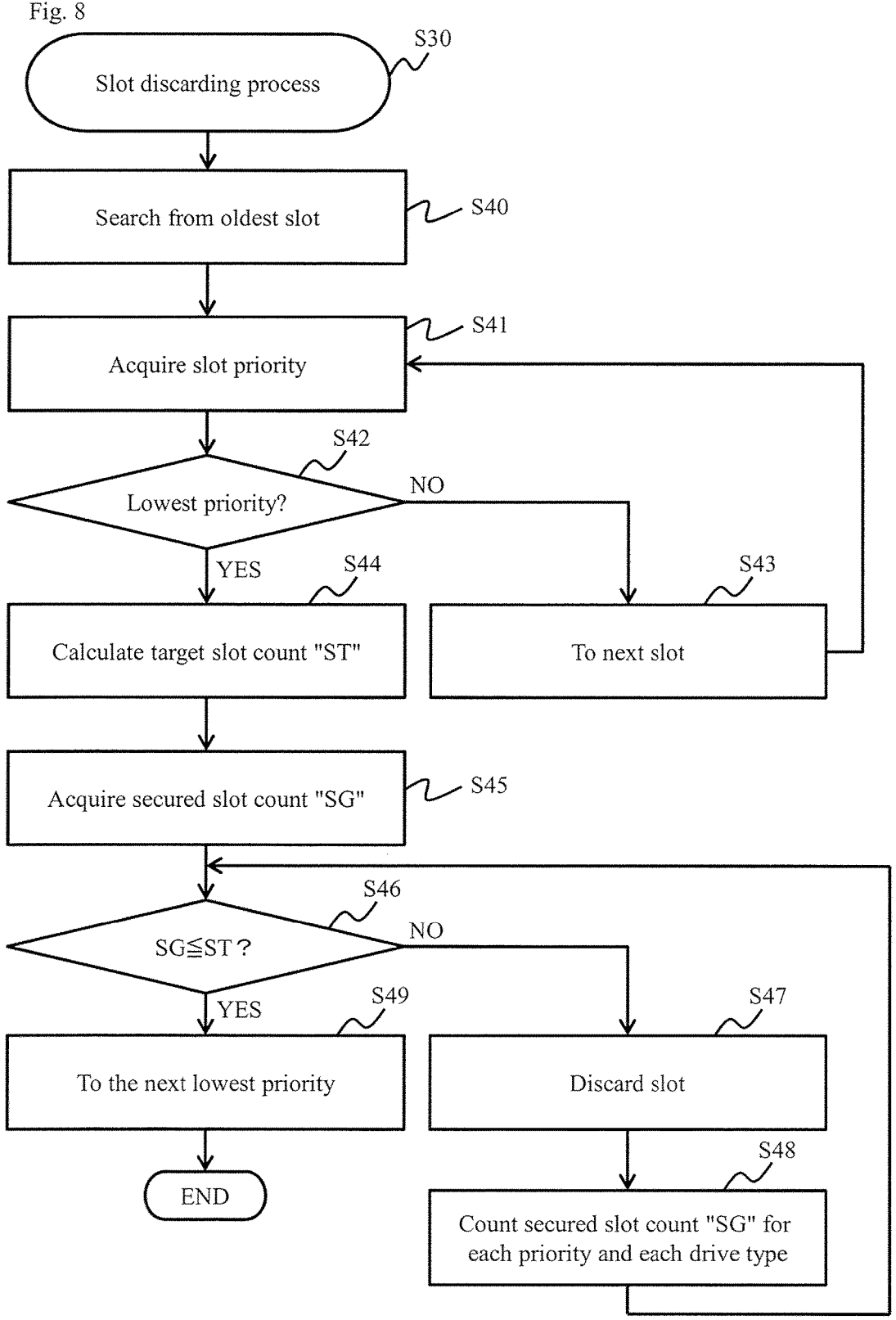
FIG. 8 is a flowchart showing a process of discarding data of slots.

The details of the slot discarding process (S30) will be described with reference to FIG. 8. The MP 131 searches from the oldest slot by referring to the slot queue SQ (S40). The MP 131 acquires the priority of the oldest slot detected as a processing target from the slot priority management table T2 (S41).

The MP 131 determines whether the priority acquired in step S41 is the lowest priority (S42). For example, when a priority of the three levels "1, 2, 3" is used, it is determined in step S42 whether the priority of the processing target slot is "3" which is the lowest value.

When it is determined that the priority of the processing target slot is not the lowest priority (S42: NO), the MP 131 moves the processing target slot to the next oldest slot (S43) and returns to step S41.

When it is determined that the priority of the processing target slot is the lowest priority (S42: YES), the MP 131 calculates the target slot count ST of the priority of the processing target slot (S44). Further, the MP 131 acquires the secured slot count SG of the priority of the processing target slot from the priority management table T1 (S45).

The MP 131 determines whether the secured slot count SG for the priority of the processing target slot is equal to or smaller than the target slot count ST (S46). When it is determined that the secured slot count SG exceeds the target slot count ST (S46: NO), the MP 131 discards the processing target slot (S47) and updates the priority table T1 and the slot priority management table T2 (S48). That is, when a number of slots exceeding the target slot count for the priority of the processing target slot are secured, the MP 131 discards one of the secured surplus slots to be converted to a vacant slot.

In contrast, when it is determined that the secured slot count SG is equal to or smaller than the target slot count ST (S46: YES), the MP 131 proceeds to the next lowest priority without discarding the processing target slot (S49). That is, when a number of slots smaller than the target slot count has been secured, the secured slots are not discarded, but this process is repeated by treating a priority that is the next lowest to the lowest priority as the lowest priority. In this manner, a number of slots up to the target slot count can be secured for each priority. Thus, even when the storage control device 10 receives a command having a low priority, it is possible to process the command using a minimum necessary number of secured slots and to suppress a delay of the response to the command having a low priority.

Before referring to FIG. 9, a method of calculating the target slot count for each priority will be described. In this example, the target slot count is calculated so that the higher the priority, the larger the number of slots can be used.

As shown in the priority table T1 of FIG. 5, a target response time C11 is set for each priority. Here, for the sake of convenience, it is assumed that a total number of slots is 100, a response time for priority 1 is 1 ms, a target response time for priority 2 is 5 ms, and a target response time for priority 3 is 10 ms.

When slots are distributed according to the ratio (10 ms:5 ms:1 ms) of the target response times for each priority (1 ms for priority 1, 5 ms for priority 2, and 10 ms for priority 3), 62 slots are allocated to priority 1, 31 slots are allocated to priority 2, and 6 slots are allocated to priority 3 (numbers less than 1 are rounded off).

Further, the target slot count for each priority is distributed according to the class of the storage device 161. In this example, it is assumed that the ratio of a response time Thdd when reading data from a hard disk drive to a response time Tssd when reading data from a flash memory device is 30:1. That is, it is assumed that a flash memory device reads data 30 times faster than the hard disk drive. In this example, the target slot count of each priority is distributed for each class of the storage device based on the ratio (HDD:SSD=30:1) of response time (average response time) of storage devices.

The case of priority 1 will be described as an example. Since the total target slot count allocated to priority 1 is 62, when the slots are distributed according to the ratio of response time of the storage devices, 59 slots are allocated to the hard disk drive and 2 slots are allocated to the flash memory device.

In this example, although two types of storage devices having different response performance (response time or response speed) are described as an example, the target slot count may be distributed based on a difference in response performance of three or more types of storage devices.

Storage devices of the same type may have different response time depending on an installed location, a communication speed, and the like. For example, even when two storage devices of the same type have different response time if one is installed in the storage control device 10, and the other is connected to the outside of the storage control device 10 via a communication network. It may be faster to read data from the storage device in the storage control device 10 than to read data from the storage device connected to the outside of the storage control device 10. Storage devices of the same type have different response time depending on their RAID configuration. When complicated parity computation is required, it may take a long time to read data. Further, storage devices of the same type have different response time depending on whether an encryption process is required or not. Thus, the target slot count may be distributed by taking such a difference in response time into consideration.

Figure 9:
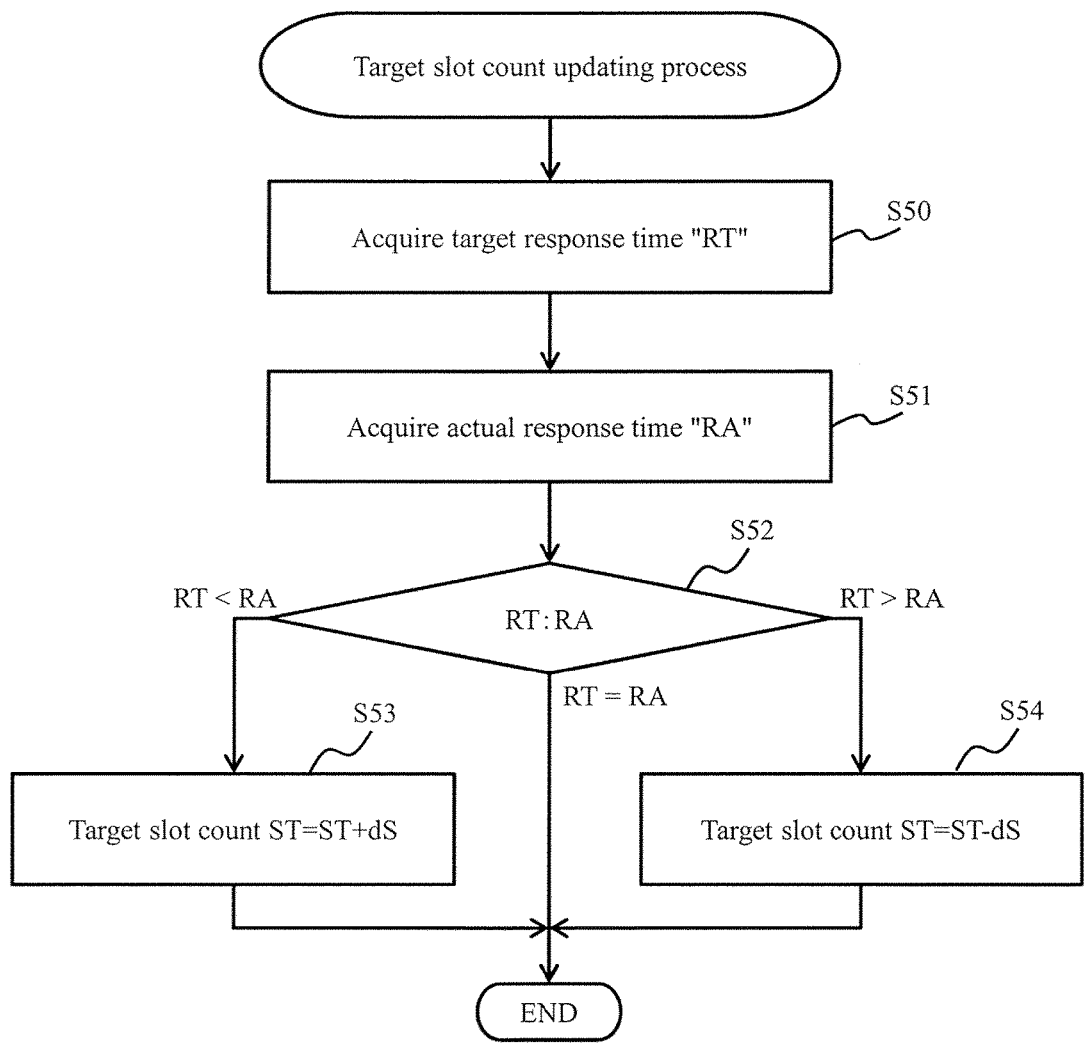
FIG. 9 is a flowchart showing a process of updating a target slot count.

FIG. 9 is a flowchart showing the process of updating the target slot count. This process is executed for each priority in a periodic or non-periodic manner. The MP 131 acquires a target response time RT for the target priority (S50) and the actual response time RA (S51) measured for the target priority from the priority table T1.

The MP 131 compares the target response time RT with the actual response time RA (S52). When it is determined that the actual response time RA is longer than the target response time RT (S52: RT<RA), the MP 131 increases the target slot count ST by a predetermined amount dS (S53) and ends this process. This is to increase a cache hit rate to decrease the actual response time RA to be shorter than the current response time so that the actual response time RA approaches the target response time RT.

When it is determined that the target response time RT is longer than the actual response time RA (S52: RT>RA), the MP 131 decreases the target slot count ST by a predetermined amount dS (S54) and ends this process. This is to decrease a cache hit rate to increase the actual response time RA to be longer than the current response time so that the actual response time RA approaches the target response time RT.

When it is determined that the target response time RT is the same as the actual response time RA (S52: RT=RA), the MP 131 ends this process without adjusting the target slot count. This process may end even when a difference between both numbers falls within a predetermined range, with this process ending not being limited to a case where the target response time RT and the actual response time RA are strictly the same.

Next, for better understanding, an example of adjusting the target slot count ST based on the difference between the target response time RT and the actual response time RA will be described. As shown in Expression (1) below, the response time when processing a read command may include a response time (cache-hit response time) when transmitting data from the cache memory 141 to the host computer 20 and a response time (cache-miss response time) when reading data from the storage device 161 and transmitting the same to the host computer 20. It is assumed that the probability that target data of a read command is present on the cache memory 141 is "H", the time required for transmitting data from the cache memory 141 to the host computer 20 is "t1", and the time required for transmitting data from the storage device 161 to the host computer 20 is "t2".

$$\text{Response time} = H^*t1 + (1-H)^*t2 \quad (1)$$

The response time changes depending on the value of the probability "H" that the target data is present on the cache memory 141. The higher the cache hit rate "H", the shorter the response time can be made. As shown in Expression (2) below, the probability "H" can be expressed as the proportion of a slot count "n" for each priority with respect to a total slot count "N" of the cache memory 141. As is clear from Expression (2), when the slot count for each priority increases, the actual response time RA approaches the target response time RT.

$$H = n/N \quad (2)$$

The slot adjustment amount "dS" can be obtained from a difference "dR" between the target response time RT for each priority and the actual response time RA. The difference "dR" in response time can be expressed as Expression (3) based on Expression (1).

$$dR = RT - RA = dH^*t1 + (1-dH)^*t2 \quad (3)$$

"dH" is a proportion of the slot adjustment amount "dS" with respect to the total slot count "N" on the cache memory 141 and can be expressed as Expression (4) based on Expression (3).

$$dH = dS/N = (dR-t2)/(t1-t2) \quad (4)$$

The slot adjustment amount "dS" can be obtained by Expression (5) based on Expression (4).

$$dS = N^*dH \quad (5)$$

In steps S53 and S54 shown in FIG. 9, the slot adjustment amount "dS" calculated by Expression (5) is multiplied with the proportion for each class of the storage device to calculate the target slot count for each class of the storage device, and the priority table T1 is updated.

Figure 10:
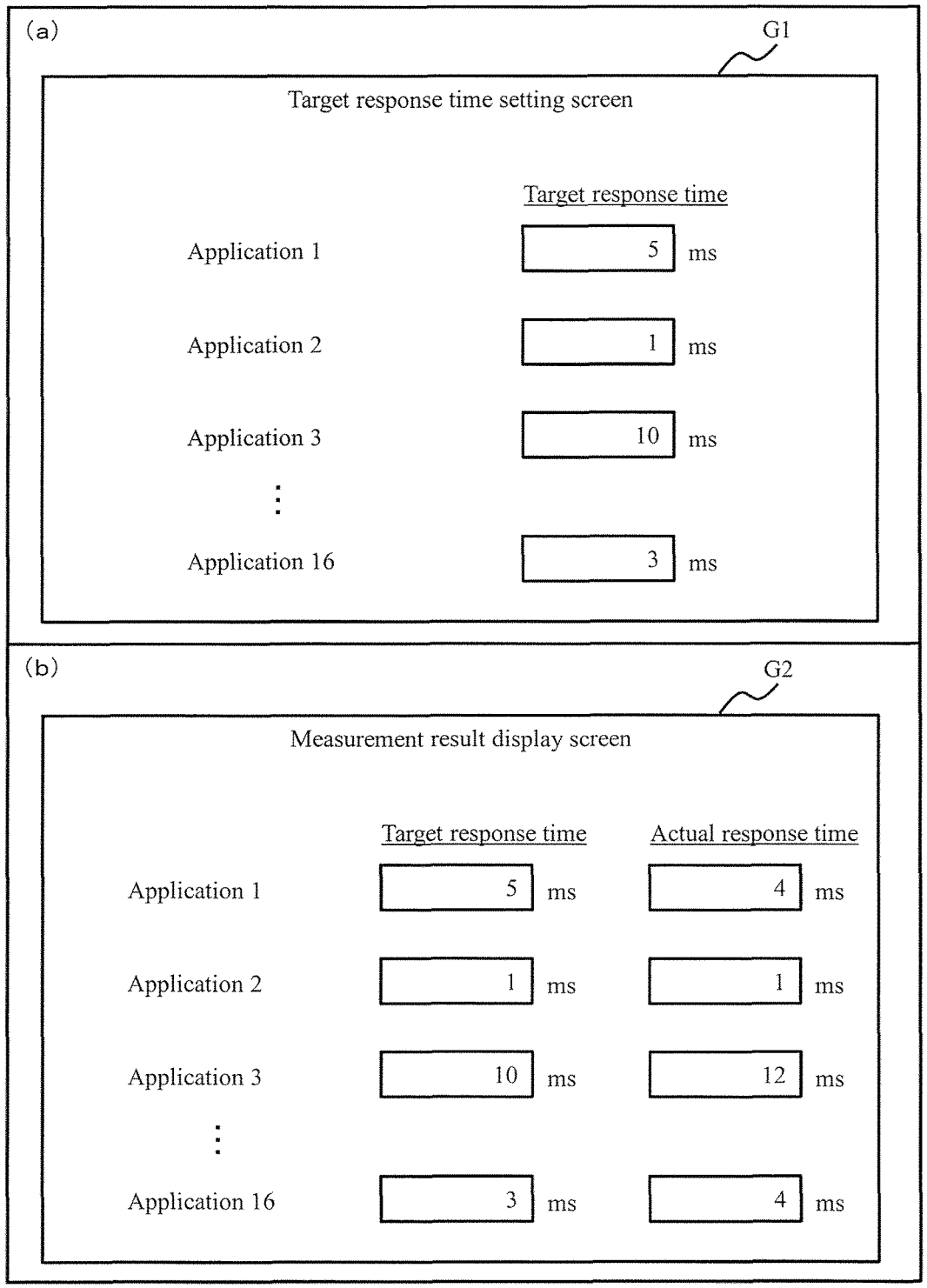
FIGS. 10(a) and 10(b) are explanatory diagrams showing a target response time setting screen and a measured response time display screen, respectively.

FIG. 10 shows an example of a user interface screen provided by the management device 30. FIG. 10(a) shows a target response time setting screen G1. A user such as a storage administrator can set a target response time for each application program that runs on the host computer 20 on the target response time setting screen G1.

The target response time for each application program and the target response time for each priority can be associated according to predetermined criteria. For example, when the value of the target response time input in the screen G1 for a certain application program falls within a first range that represents the range of target response time of priority 1, the value is converted to the target response time of priority 1 and stored in the priority table T1. Similarly, when the value of the target response time input in the screen G1 falls within a second range that represents the range of target response time of priority 2, the value is converted to the target response time of priority 2 and stored in the priority table T1. Similarly, when the value of the target response time input in the screen G1 falls within a third range that represents the range of target response time of priority 3, the value is converted to the target response time of priority 3 and stored in the priority table T1.

FIG. 10(b) shows a response time measurement result display screen G2. The management device 30 can acquire information on the actual response time of the storage control device 10 via the SVP 17. The measurement result display screen G2 displays the target response time and the actual response time in association for each application program. In this manner, the user can understand the response time for each application program at a glance.

In this example having such a configuration, the storage control device 10 processes a command having a high priority preferentially and performs slot control so that the data of a high priority is present on the cache memory 141 for a longer period. In this example, by executing the execution sequence control of commands and the cache control based on the priorities of the commands, it is possible to process commands having the higher priority in a shorter response time and to improve the response performance of the storage control device 10.

In this example, since the target slot count set for each priority is controlled according to the difference between the target response time for each priority and the actual response time, it is possible to allocate an appropriate number of slots for the conditions of the storage control device 10 to each priority.

In this example, the target slot count for each priority is distributed according to the class of the storage device. Thus, by allocating a larger number of slots to the low-speed storage device than the number of slots allocated to the high-speed storage device, it is possible to improve the overall response performance.

The present invention can be expressed as a computer program or a computer program recording medium as below.

A computer program (or a computer program recording medium) for causing a computer device connected to a host computer to function as a storage control device, the program causing the computer device to implement:

a communication unit that receives a command, to which a priority is set, from the host computer;

a command executing unit that executes the command received from the communication unit according to the priority;

a cache memory that is used by the command executing unit; and a cache controller that manages slots of the cache memory, the cache controller setting the priority to a slot that stores a target data of the command and controlling data stored in the slot according to the priority.

REFERENCE SIGNS LIST

1 Storage control device
2 Host computer
3 Management computer
10 Storage control device
11 Channel adapter
12 Disc adapter
13 Microprocessor package
14 Cache memory package
161 Storage device
20 Host computer
30 Management device

The invention claimed is:

1. A storage control device connected to a host computer, comprising:
  a communication unit that receives a command, to which a priority is set, from the host computer;
  a command executing unit that executes the command received from the communication unit according to the priority;
  a cache memory that is used by the command executing unit;
  a cache controller that manages slots of the cache memory; and
  a plurality of storage devices that stores data used by the host computer, including a high speed storage device whose response speed is high and a low speed storage device whose response speed is low, wherein
  the cache controller sets the priority to a slot that stores target data of the command and controls the data to allocate slots for each priority by using a target slot count that is set for each priority as a target value, so that data whose priority is high stay in the cache memory a long time, and distributes the target slot count that is set for each priority to the high speed storage device and the low speed storage device inversely proportional to the response speed.

2. The storage control device according to claim 1, wherein
  the cache controller sets the target slot count based on a target response time that is set for each priority.

3. The storage control device according to claim 2, wherein
  the cache controller controls the target slot count based on a difference between an actual response time required for processing the command and the target response time set for the slot that stores the target data.

4. The storage control device according to claim 3, wherein
  when a new command, under which the data stored in a slot is targeted, is received, the cache controller compares a priority of the new command with a priority set to the data stored in the slot and uses the higher priority as the priority of the data stored in the slot.

5. The storage control device according to claim 1, wherein
  the cache controller performs control so that data, the non-used time of which is longest and which is stored in a predetermined slot having the lowest priority is discarded first.

6. The storage control device according to claim 5, wherein
  when the number of slots allocated to a priority that is set to the predetermined slot exceeds a predetermined value, the cache controller discards data stored in the predetermined slot.

7. The storage control device according to claim 1, further comprising:
  a host-side communication device connected to the host computer so as to accomplish implementation of the communication unit;
  a drive-side communication device connected to the plurality of storage devices;
  a cache memory device having the cache memory; and
  a microprocessor device connected to the host-side communication device, the drive-side communication device, the cache memory device, and the management communication device, wherein
  the microprocessor device includes:
  a plurality of command executing units;
  a memory unit that is shared by the plurality of command executing units;
  a first queue provided in the memory unit so as to manage an execution sequence of commands;
  a second queue provided in the memory unit so as to discard data according to the priority that is set to each slot; and
  a management table provided in the memory unit so as to manage the priority for each slot and a type of a destination storage device after associating the priority with the type,
  a command executing unit that executes the commands among the plurality of command executing units executes the commands according to the priority using the first queue, and
  the cache controller is configured such that:
  the priority set to the command is set to a slot that stores the target data of the command;
  the priority set to the slot that stores the target data and the type of whether a storage device, which is the storage destination of the target data, is the high speed storage device or the low speed storage device are set in the management table;
  a target slot count for each priority is set based on a target response time that is set such that the higher the priority the shorter the target response time and the type of the destination storage device;
  slots are allocated to each of the plurality of priorities so that the larger the number of slots becomes the higher the priority is set by using the target slot count as a target value;
  the target slot count is controlled based on a difference between an actual response time required for the command executing unit to process the command and the target response time set to a slot that stores the target data, so that the target slot count is decreased when the actual response time is shorter than the target response time and the target slot count is increased when the actual response time is longer than the target response time;
  when a new command, under which the data stored in a slot is target, is received, the priority of the new command is compared with the priority set to the target data stored in the slot, and the higher priority is used as the priority of the target data stored in the slot; and
  data the non-used time of which is longest and which is stored in a predetermined slot having the lowest priority is discarded is discarded when the number of slots allocated to the priority that is set to the predetermined slot exceeds a predetermined value.

* * * * *